J. SCHEELAND.
NIPPLE FOR LEAD PIPE JOINTS.
APPLICATION FILED FEB. 16, 1916.
1,280,311.
Patented Oct. 1, 1918.
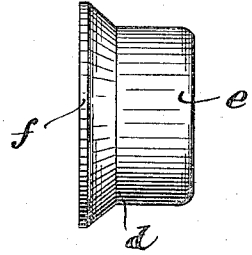
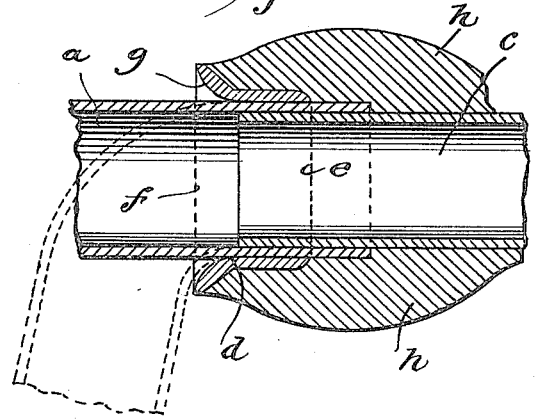
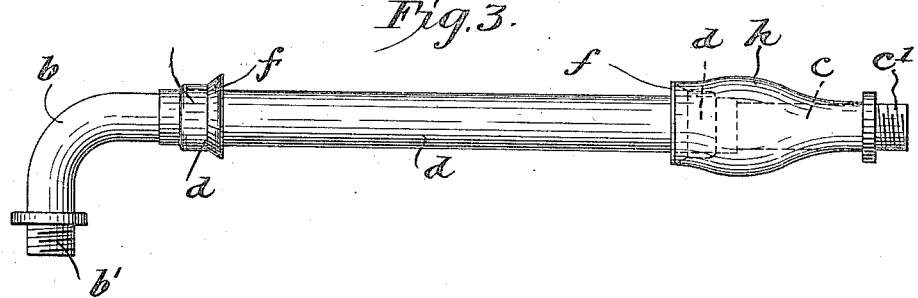
Inventor:
John Scheeland.

UNITED STATES PATENT OFFICE.

JOHN SCHEELAND, OF PORTLAND, OREGON.

NIPPLE FOR LEAD-PIPE JOINTS.

1,280,311.  Specification of Letters Patent.  Patented Oct. 1, 1918.

Application filed February 16, 1916. Serial No. 78,787.

*To all whom it may concern:*

Be it known that I, JOHN SCHEELAND, a citizen of the United States, and a resident of Portland, county of Multnomah, State of Oregon, have invented a certain new and useful Improvement in Nipples for Lead-Pipe Joints, of which the following is a specification.

This invention relates generally to pipe connections and has particular reference to an improved means for effecting a wipe joint union between pipe members of unequal susceptibility to fusion by heat, specifically a lead-pipe section and a brass solder nipple, as commonly done in main connections for water service. As is well known, lead-pipe sections are used for such connections in order to provide a certain degree of flexibility; but since the joint between the lead-pipe and brass solder nipple is usually of the type known as wiped joints, that is, made by running hot solder around the joint and wiping it into form, the intense heat of the hot solder tends to crystallize the lead at the surface of contact, thereby diminishing its durability in service. Furthermore, it is necessary to keep the lead-pipe clear of sharp edges, so that it will not be injured in bending, either by hand while making a connection, or by the heavy pressure applied or transmitted by the earth, or other material, in which the pipe is embedded. In short, it is apparent that there are two causes which affect the life of a pipe connection such as referred to; namely, intense heat and sharp contacting edges, both of which must be avoided.

The object of my invention is to prevent such condition by protecting the lead-pipe, at the place where it will have to sustain more or less bending, from being deteriorated by the intense heat due to the joint-forming operation. A further object of my invention is to incorporate in said joint means presenting a curved surface for the lead pipe to bend against, and thus causing the lead pipe to bend on the curve of long radius instead of abruptly, and in so doing further reducing the danger of injuring or breaking the lead pipe in bending.

I attain my object by inserting the pipe ends one in the other then encompassing these ends with an insulating sleeve of lesser length than the lead pipe so that an end of the latter projects, making the opposite or outer end of the insulating sleeve with a flare, the inner face of which is made convex, and then completing the union by enveloping the parts with a wipe joint of solder extended from said flared extremity of the insulating sleeve to a point on the nipple lying a substantial distance beyond said joint, as illustrated in Fig. 2; in so doing firmly uniting the parts, substantially as illustrated in the accompanying drawings.

The result so attained is: The insulating sleeve bears the intense heat of the solder run over the parts in forming the joint; and, furthermore, the flared end of the insulating sleeve increases the insulation at, and prevents the heat from being directly applied to that portion of the lead pipe which has to sustain the flexural stress; in fact, said flared end serves to disperse the heat by being spaced from the lead pipe, as shown.

Furthermore, in bending the lead pipe the inner face of said flared end of the insulating sleeve will serve as a forming surface, and cause the bend to assume a curve having a radius of sufficient length to prevent any breaking stress being applied to the pipe while being bent. The flared end of said insulating sleeve also prevents any sharp surface being brought to bear upon the lead pipe, which would tend to cut and break the latter, particularly if in a crystallized state.

In the drawings:

Figure 1 is a side elevation of the sleeve employed by me in forming the joint;

Fig. 2 is a vertical, longitudinal section showing the practical carrying out of my invention; also illustrating in broken outline how the flare of the insulating sleeve facilitates the bending of the lead pipe at the joint; and Fig. 3 is an elevation of a lead-pipe section both ends of which are joined to iron pipes, the joint on the right end being complete but the joint on the left end being incomplete.

*a* represents a lead-pipe section, *b* and *c* are brass solder nipples provided at one end with a coupling as *b′*, *c′*, and which nipples are joined to the ends of the lead pipe, and *d* are the insulating sleeves used in forming the joints.

The insulating sleeves comprise cylindrical bodies e, which are adapted to be slipped over the lead-pipe a, and provided with a peripheral flaring flange f, the inner face of which is convexed, as shown at g in Fig. 2. The insulating sleeve is first slipped in place on the lead pipe a, and the end of the latter is then expanded, in accordance with the usual plumbing practice, so as to admit the corresponding end of the brass solder nipple c. The outer surfaces of the insulating sleeve and iron pipe are then tinned or otherwise prepared so as to hold the solder, and the lead-pipe adjacent the joint is scraped for the same purpose. The solder h is then applied around the joint in such manner as to envelop the sleeve, as shown in Fig. 2, and the solder is wiped until the desired joint is fully formed.

I claim:

In a pipe joint comprising members of unequal susceptibility to fusion by heat, having their ends inserted one in the other, the combination of a metallic insulating sleeve placed over said joint, being less in length than the latter so as to leave an exposed end of the member of low susceptibility, the opposite end of said sleeve being flared, and the inner face of such flare made convex in cross section for the purpose specified, and an encompassing body of wiped solder extending from the outer end of said sleeve to a point on said member of lesser susceptibility, located a substantial distance beyond said joint.

JOHN SCHEELAND.